(12) United States Patent  
Tyler

(10) Patent No.: US 10,105,910 B2  
(45) Date of Patent: Oct. 23, 2018

(54) METHOD FOR CONTINUOUSLY MANUFACTURING COMPOSITE HOLLOW STRUCTURE

(71) Applicant: CC3D LLC, Coeur D'Alene, ID (US)

(72) Inventor: Kenneth Lyle Tyler, Coeur D'Alene, ID (US)

(73) Assignee: CC3D LLC, Coeur d'Alene, ID (US)

( * ) Notice: Subject to any disclaimer, the term of this patent is extended or adjusted under 35 U.S.C. 154(b) by 438 days.

(21) Appl. No.: 15/130,412

(22) Filed: Apr. 15, 2016

(65) Prior Publication Data

US 2017/0297053 A1 Oct. 19, 2017

(51) Int. Cl.
| | |
|---|---|
| B29C 70/38 | (2006.01) |
| B29C 47/12 | (2006.01) |
| B29C 70/52 | (2006.01) |
| B29C 47/10 | (2006.01) |
| B29C 47/26 | (2006.01) |
| B29C 47/02 | (2006.01) |
| B29C 47/00 | (2006.01) |
| B29C 70/54 | (2006.01) |

(Continued)

(52) U.S. Cl.
CPC .......... *B29C 70/38* (2013.01); *B29C 35/0261* (2013.01); *B29C 35/0805* (2013.01); *B29C 47/0035* (2013.01); *B29C 47/026* (2013.01); *B29C 47/1045* (2013.01); *B29C 47/122* (2013.01); *B29C 47/268* (2013.01); *B29C 70/00* (2013.01); *B29C 70/205* (2013.01); *B29C 70/222* (2013.01); *B29C 70/523* (2013.01); *B29C 70/545* (2013.01); *B29C 70/521* (2013.01); *B29C 70/526* (2013.01); *B29C 2035/0827* (2013.01)

(58) Field of Classification Search  
None  
See application file for complete search history.

(56) References Cited

U.S. PATENT DOCUMENTS 2,635,560 A * 4/1953 Coyne .................. A21C 11/163  
                                                                425/288  
3,178,328 A * 4/1965 Tittmann ............ B29C 47/0033  
                                                                156/167

(Continued)

FOREIGN PATENT DOCUMENTS

| DE | 4102257 | 7/1992 |
|---|---|---|
| EP | 2589481 B1 | 1/2016 |

(Continued)

OTHER PUBLICATIONS

Hyouk Ryeol Choi and Se-gon Roh, In-pipe Robot with Active Steering Capability for Moving Inside of Pipelines, Bioinspiration and Robotics: Walking and Climbing Robots, Sep. 2007, p. 544, I-Tech, Vienna, Austria.

(Continued)

*Primary Examiner* — Matthew J Daniels  
*Assistant Examiner* — Manley L Cummins, IV  
(74) *Attorney, Agent, or Firm* — Ryan C. Stockett

(57) ABSTRACT

A method is disclosed for continuously manufacturing a composite hollow structure. The method may include continuously coating fibers with a matrix, and revolving matrix-coated fibers about a non-fiber axis. The method may also include diverting the matrix-coated fibers radially outward away from the non-fiber axis, and curing the matrix-coated fibers.

20 Claims, 6 Drawing Sheets

(51) Int. Cl.
*B29C 35/02* (2006.01)
*B29C 35/08* (2006.01)
*B29C 70/00* (2006.01)
*B29C 70/20* (2006.01)
*B29C 70/22* (2006.01)

(56) References Cited

U.S. PATENT DOCUMENTS

| | | | |
|---|---|---|---|
| 3,183,135 A * | 5/1965 | Berquist | B29D 30/0061 156/117 |
| 3,286,305 A | 11/1966 | Seckel | |
| 3,303,251 A * | 2/1967 | Santelli | B29C 47/021 156/500 |
| 3,331,725 A * | 7/1967 | Mercer | B30B 1/26 156/167 |
| 3,384,530 A * | 5/1968 | Mercer | B29C 47/122 156/167 |
| 3,393,536 A * | 7/1968 | Daur | F16D 3/50 277/503 |
| 3,565,985 A * | 2/1971 | Lemelson | B29C 47/0016 138/42 |
| 3,587,281 A * | 6/1971 | Shrenk | B21C 23/085 264/209.2 |
| 3,644,696 A | 2/1972 | Magner et al. | |
| 3,697,209 A * | 10/1972 | Schiesser | B29C 47/023 264/171.2 |
| 3,809,514 A | 5/1974 | Nunez | |
| 3,873,024 A | 3/1975 | Probst et al. | |
| 3,984,271 A | 10/1976 | Gilbu | |
| 3,993,726 A | 11/1976 | Moyer | |
| 4,100,240 A * | 7/1978 | Bassani | B29C 47/0004 138/174 |
| 4,344,808 A | 8/1982 | Healey et al. | |
| 4,472,126 A * | 9/1984 | Mitsui | B29C 47/023 156/149 |
| 4,515,737 A * | 5/1985 | Karino | B29C 47/0023 156/172 |
| 4,643,940 A | 2/1987 | Shaw et al. | |
| 4,671,761 A | 6/1987 | Adrian et al. | |
| 4,822,548 A | 4/1989 | Hempel | |
| 4,851,065 A | 7/1989 | Curtz | |
| 5,002,712 A | 3/1991 | Goldmann et al. | |
| 5,037,691 A | 8/1991 | Medney et al. | |
| 5,041,713 A | 8/1991 | Weidman | |
| 5,069,853 A * | 12/1991 | Miller | B29C 47/0035 264/176.1 |
| 5,128,084 A | 7/1992 | Tompkins et al. | |
| 5,139,710 A * | 8/1992 | Smith | B29B 15/122 264/103 |
| 5,226,021 A * | 7/1993 | Dell'Olio | G04B 45/0069 368/12 |
| 5,286,183 A * | 2/1994 | Tonsi | B29C 47/0016 425/113 |
| 5,292,472 A * | 3/1994 | Tompkins | B29C 47/0023 156/117 |
| 5,296,335 A | 3/1994 | Thomas et al. | |
| 5,340,433 A | 8/1994 | Crump | |
| 5,503,872 A | 4/1996 | MacKenzie et al. | |
| 5,520,870 A * | 5/1996 | Allan | B29C 47/0023 264/209.3 |
| 5,746,967 A | 5/1998 | Hoy et al. | |
| 5,866,058 A | 2/1999 | Batchelder et al. | |
| 5,879,602 A * | 3/1999 | Scheuring | B29B 15/122 118/124 |
| 5,936,861 A * | 8/1999 | Jang | B29C 70/384 700/98 |
| 6,042,765 A | 3/2000 | Sugahara et al. | |
| 6,153,034 A | 11/2000 | Lipsker | |
| 6,459,069 B1 | 10/2002 | Rabinovich | |
| 6,501,554 B1 | 12/2002 | Hackney et al. | |
| 6,601,627 B2 | 8/2003 | Kasai et al. | |
| 6,934,600 B2 | 8/2005 | Jang et al. | |
| 7,795,349 B2 | 9/2010 | Bredt et al. | |
| 7,959,983 B1 | 6/2011 | Farrar et al. | |
| 8,221,669 B2 | 7/2012 | Batchelder et al. | |
| 8,956,559 B2 * | 2/2015 | Kimura | B29C 47/28 264/177.16 |
| 9,126,365 B1 | 9/2015 | Mark et al. | |
| 9,126,367 B1 | 9/2015 | Mark et al. | |
| 9,149,988 B2 | 10/2015 | Mark et al. | |
| 9,156,205 B2 | 10/2015 | Mark et al. | |
| 2002/0009935 A1 | 1/2002 | Hsiao et al. | |
| 2002/0062909 A1 | 5/2002 | Jang et al. | |
| 2002/0113331 A1 | 8/2002 | Zhang et al. | |
| 2002/0165304 A1 | 11/2002 | Mulligan et al. | |
| 2003/0044539 A1 | 3/2003 | Oswald | |
| 2003/0056870 A1 | 3/2003 | Comb et al. | |
| 2003/0160970 A1 | 8/2003 | Basu et al. | |
| 2003/0186042 A1 | 10/2003 | Dunlap et al. | |
| 2003/0236588 A1 | 12/2003 | Jang et al. | |
| 2005/0061422 A1 | 3/2005 | Martin | |
| 2005/0104257 A1 | 5/2005 | Gu et al. | |
| 2005/0109451 A1 | 5/2005 | Hauber et al. | |
| 2005/0230029 A1 | 10/2005 | Vaidyanathan et al. | |
| 2007/0003650 A1 | 1/2007 | Schroeder | |
| 2007/0228592 A1 | 10/2007 | Dunn et al. | |
| 2008/0087371 A1 * | 4/2008 | Friedrich | B29C 53/60 156/166 |
| 2008/0176092 A1 | 7/2008 | Owens | |
| 2009/0065971 A1 * | 3/2009 | De Rijcke | B29C 47/0035 264/209.8 |
| 2009/0095410 A1 | 4/2009 | Oldani | |
| 2009/0246384 A1 | 10/2009 | Liao et al. | |
| 2011/0032301 A1 | 2/2011 | Fienup et al. | |
| 2011/0143108 A1 | 6/2011 | Fruth et al. | |
| 2012/0060468 A1 | 3/2012 | Dushku et al. | |
| 2012/0231225 A1 | 9/2012 | Mikulak et al. | |
| 2012/0247655 A1 | 10/2012 | Erb et al. | |
| 2013/0092316 A1 | 4/2013 | Pakal et al. | |
| 2013/0115324 A1 * | 5/2013 | Hegler | B29C 47/0023 425/133.1 |
| 2013/0164498 A1 | 6/2013 | Langone et al. | |
| 2013/0209600 A1 | 8/2013 | Tow | |
| 2013/0233471 A1 | 9/2013 | Kappesser | |
| 2013/0337265 A1 | 12/2013 | Farmer | |
| 2014/0061974 A1 | 3/2014 | Tyler | |
| 2014/0159284 A1 | 6/2014 | Leavitt | |
| 2014/0291886 A1 | 10/2014 | Mark et al. | |
| 2016/0031155 A1 | 7/2015 | Tyler | |
| 2016/0059481 A1 | 3/2016 | Starodubtsev | |
| 2017/0028623 A1 | 2/2017 | Evans et al. | |
| 2017/0028633 A1 | 2/2017 | Evans et al. | |
| 2017/0028635 A1 | 2/2017 | Evans et al. | |
| 2017/0028644 A1 | 2/2017 | Evans et al. | |

FOREIGN PATENT DOCUMENTS

| | | |
|---|---|---|
| KR | 100995983 | 11/2010 |
| KR | 101172859 | 8/2012 |
| WO | WO 2013017284 | 2/2013 |

OTHER PUBLICATIONS

International Search Report dated Oct. 13, 2016 for PCT/US2016/042906 to CC3D LLC filed Jul. 19, 2016.

T. M. Llewelly-Jones, Bruce W. Drinkwater, and Richard S. Trask; 3D Printed Components With Ultrasonically Arranged Microscale Structure, Smart Materials and Structures, 2016, pp. 1-6, vol. 25, IOP Publishing Ltd., UK.

International Search Report dated Aug. 2, 2017 for PCT/US2017/026976 filed for CC3D LLC on Apr. 11, 2017.

Invernizzi et al. UV-Assisted 3D Printing of Glass and Carbon Fiber-Reinforced Dual-Cure Polymer Composites, Materials 2016, 9, 583, doi: 10.3390/ma9070583.

S. Kumar & J.-P. Kruth, Composites by Rapid Prototyping Technology, Materials and Design, vol. 31, Issue 2, pp. 850-856 (Feb. 2010).

(56) References Cited

OTHER PUBLICATIONS

C. Fragassa, & G. Minak, Standard Characterization for Mechanical Properties of Photopolymer Resins for Rapid Prototyping. 1$^{st}$ Symposium on Multidisciplinary Studies of Design in Mechanical Engineering, Bertinoro, Italy (Jun. 25-28, 2008).

S. L. Fan, F. Y. C. Boey, & M. J. M. Abadie, UV Curing of a Liquid Based Bismaleimide-Containing Polymer System, eXPRESS Polymer Letters, vol. 1, No. 6, pp. 397-405 (2007).

A. Endruweit, M.S. Johnson, & A.C. Long, Curing of Composite Components by Ultraviolet Radiation: A Review, Polymer Composites, vol. 27, Issue 2, pp. 119-128 (Apr. 2006).

Yugang Duan et al., Effects of Compaction and UV Exposure on Performance of Acrylate/Glass-Fiber Composites Cured Layer by Layer, Journal of Applied Polymer Science, vol. 123, Issue 6, pp. 3799-3805 (Mar. 15, 2012).

P. Compston, J. Schiemer, & A. Cvetanovska, Mechanical Properties and Styrene Emission Levels of a UV-Cured Glass-Fibre/Vinylester Composite, Composite Structures, vol. 86, Issues 1-3, pp. 22-26 (Nov. 2008).

M. Martin-Gallego et al., Epoxy-Graphene UV-Cured Nanocomposites, Polymer, vol. 52, Issue 21, pp. 4664-4669 (Sep. 29, 2011).

Vincent J. Lopata el al., Electron-Beam-Curable Epoxy Resins for the Manufacture of High-Performance Composites, Radiation Physics and Chemistry, vol. 56, Issue 4, pp. 405-415 (Oct. 1999).

A. Di. Pietro & Paul Compston, Resin Hardness and Interlaminar Shear Strength of a Glass-Fibre/Vinylester Composite Cured with High Intensity Ultraviolet (UV) Light, Journal of Materials Science, vol. 44, Issue 15, pp. 4188-4190 (Aug. 2009).

Kenneth C. Kennedy II & Robert P. Kusy, UV-Cured Pultrusion Processing of Glass-Reinforced Polymer Composites, Journal of Vinyl and Additive Technology, vol. 1, Issue 3, pp. 182-186 (Sep. 1995).

English Language Abstract of DE 4102257, published Jul. 30, 1992, obtained from LexisNexis Total Patent.

English Language Abstract of KR 100995983, published Nov. 23, 2010, obtained from LexisNexis Total Patent.

English Language Abstract of KR 101172859, published Aug. 9, 2012, obtained from LexisNexis Total Patent.

* cited by examiner

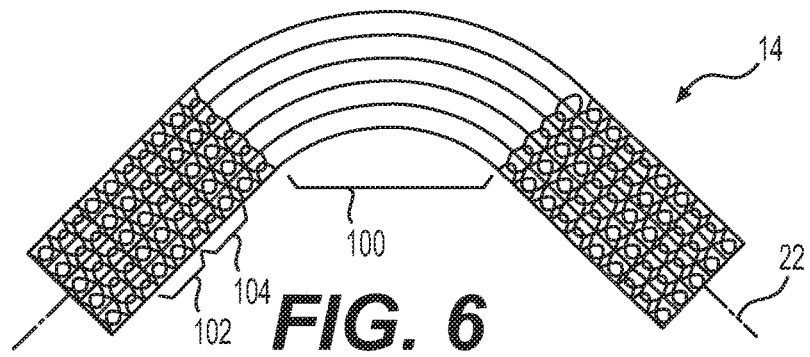
FIG. 6
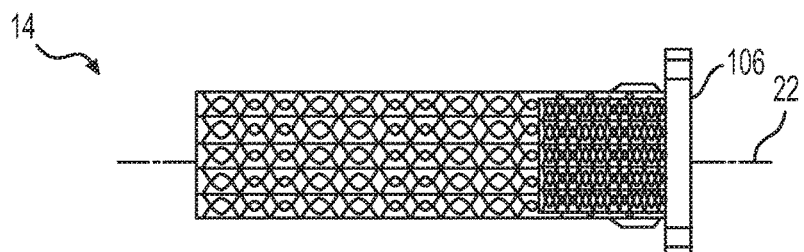
FIG. 7
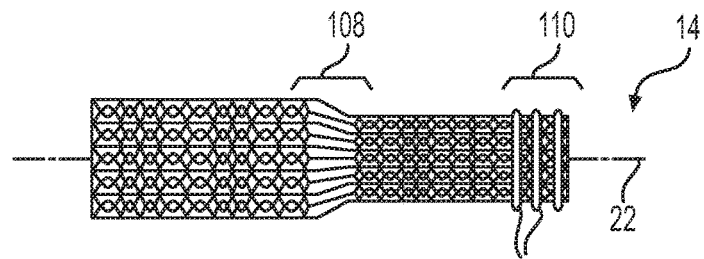
FIG. 8
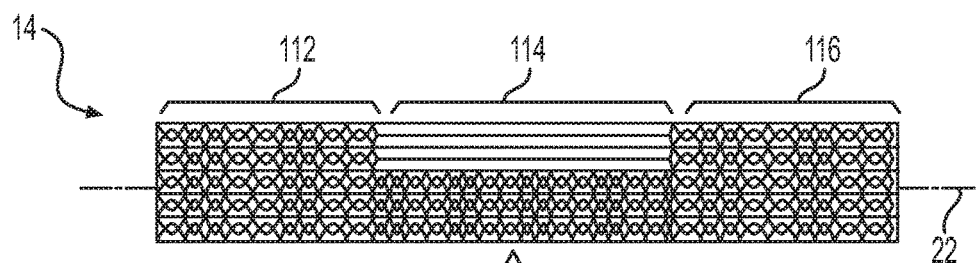
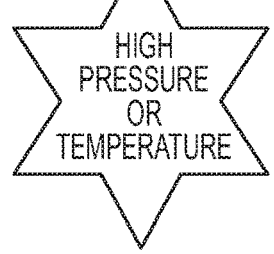
FIG. 9

METHOD FOR CONTINUOUSLY MANUFACTURING COMPOSITE HOLLOW STRUCTURE

TECHNICAL FIELD

The present disclosure relates generally to a manufacturing method and, more particularly, to a method for continuously manufacturing composite hollow structures.

BACKGROUND

Extrusion manufacturing is a known process for producing continuous hollow structures. During extrusion manufacturing, a liquid matrix (e.g., a thermoset resin or a heated thermoplastic) is pushed through a die having a desired cross-sectional shape and size. The material, upon exiting the die, cures and hardens into a final form. In some applications, UV light and/or ultrasonic vibrations are used to speed the cure of the liquid matrix as it exits the die. The hollow structures produced by the extrusion manufacturing process may have any continuous length, with a straight or curved profile, a consistent cross-sectional shape, and excellent surface finish. Although extrusion manufacturing can be an efficient way to continuously manufacture hollow structures, the resulting structures may lack the strength required for some applications.

Pultrusion manufacturing is a known process for producing high-strength hollow structures. During pultrusion manufacturing, individual fiber strands, braids of strands, and/or woven fabrics are coated with or otherwise impregnated with a liquid matrix (e.g., a thermoset resin or a heated thermoplastic) and pulled through a stationary die where the liquid matrix cures and hardens into a final form. As with extrusion manufacturing, UV light and/or ultrasonic vibrations are used in some pultrusion applications to speed the cure of the liquid matrix as it exits the die. The hollow structures produced by the pultrusion manufacturing process have many of the same attributes of extruded structures, as well as increased strength due to the integrated fibers. Although pultrusion manufacturing can be an efficient way to continuously manufacture high-strength hollow structures, the resulting structures may lack the form required for some applications. In addition, the variety of fiber patterns integrated within the pultruded hollow structures may be limited, thereby limiting available characteristics of the resulting hollow structures.

The disclosed method is directed to overcoming one or more of the problems set forth above and/or other problems of the prior art.

SUMMARY

In one aspect, the present disclosure is directed to a method of continuously manufacturing a hollow structure. The method may include continuously coating fibers with a matrix, and revolving matrix-coated fibers about a non-fiber axis. The method may also include diverting the matrix-coated fibers radially outward away from the non-fiber axis, and curing the matrix-coated fibers.

In another aspect, the present disclosure is directed to another method of continuously manufacturing a hollow structure. This method may include continuously coating fibers with a matrix, revolving a first subset of the matrix-coated fibers in a first direction, and revolving a second subset of the matrix-coated fibers in a second direction opposite the first. The method may also include diverting the matrix-coated fibers radially outward away from the non-fiber axis, pressing the first subset of the matrix-coated fibers against the second subset of the matrix-coated fibers, and curing the matrix-coated fibers. The method may further include dynamically adjusting revolving of the first and second subsets of the matrix-coated fibers during manufacturing of the composite hollow structure, and mechanically pinching the matrix-coated fibers prior to curing the matrix-coated fibers in order to fix a length of the composite hollow structure.

BRIEF DESCRIPTION OF THE DRAWINGS

FIGS. 6-9 are diagrammatic illustrations of exemplary disclosed hollow structures that may be manufactured with the system of FIGS. 1 and 2.

DETAILED DESCRIPTION

Figure 1:
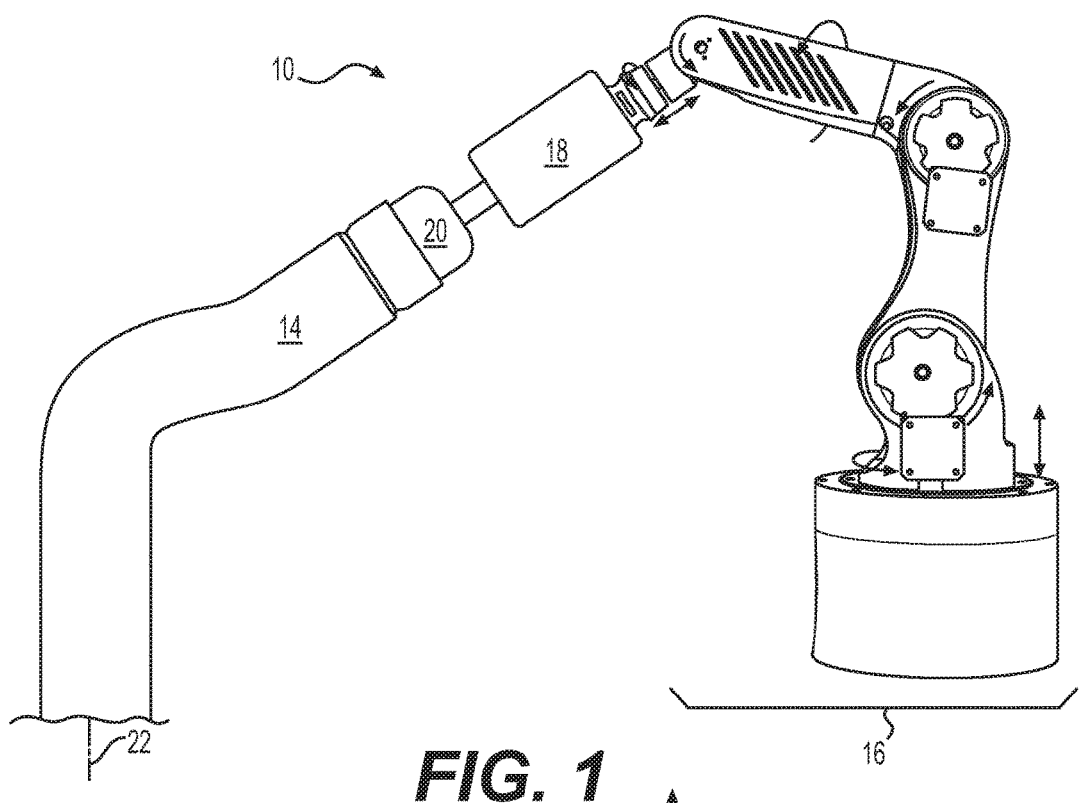
FIGS. 1 and 2 are diagrammatic illustrations of exemplary disclosed manufacturing systems.
Figure 2:
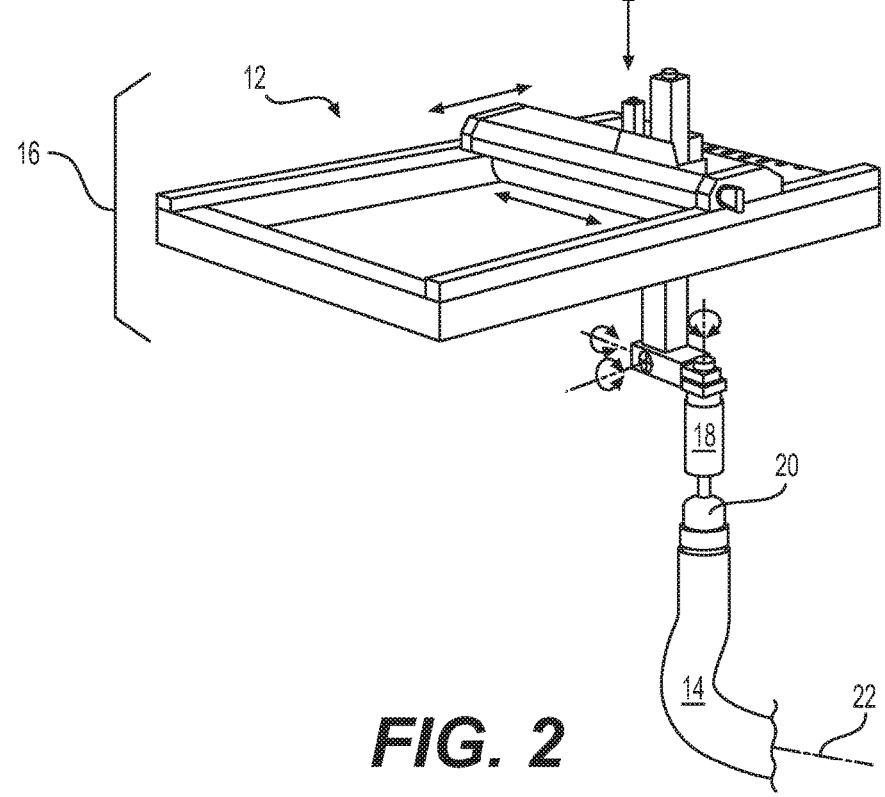

FIGS. 1 and 2 illustrate different exemplary systems 10 and 12, which may be used to continuously manufacture hollow composite structures (e.g., tubes, hoses, channels, conduits, ducts, etc.) 14 having any desired cross-sectional shape (e.g., circular or polygonal). Each of systems 10, 12 may include a support 16, a drive 18, and a head 20. Head 20 may be coupled to support 16 via drive 18. In the disclosed embodiment of FIG. 1, support 16 is a robotic arm capable of moving drive 18 and head 20 in multiple directions during fabrication of structure 14, such that a resulting longitudinal axis 22 of structure 14 is three-dimensional. In the embodiment of FIG. 2, support 16 is an overhead gantry also capable of moving head 20 and drive 18 in multiple directions during fabrication of structures 14. Although supports 16 of both embodiments are shown as being capable of 6-axis movements, it is contemplated that any other type of support 16 capable of moving drive 18 and head 20 in the same or a different manner could also be utilized, if desired.

Figure 3:
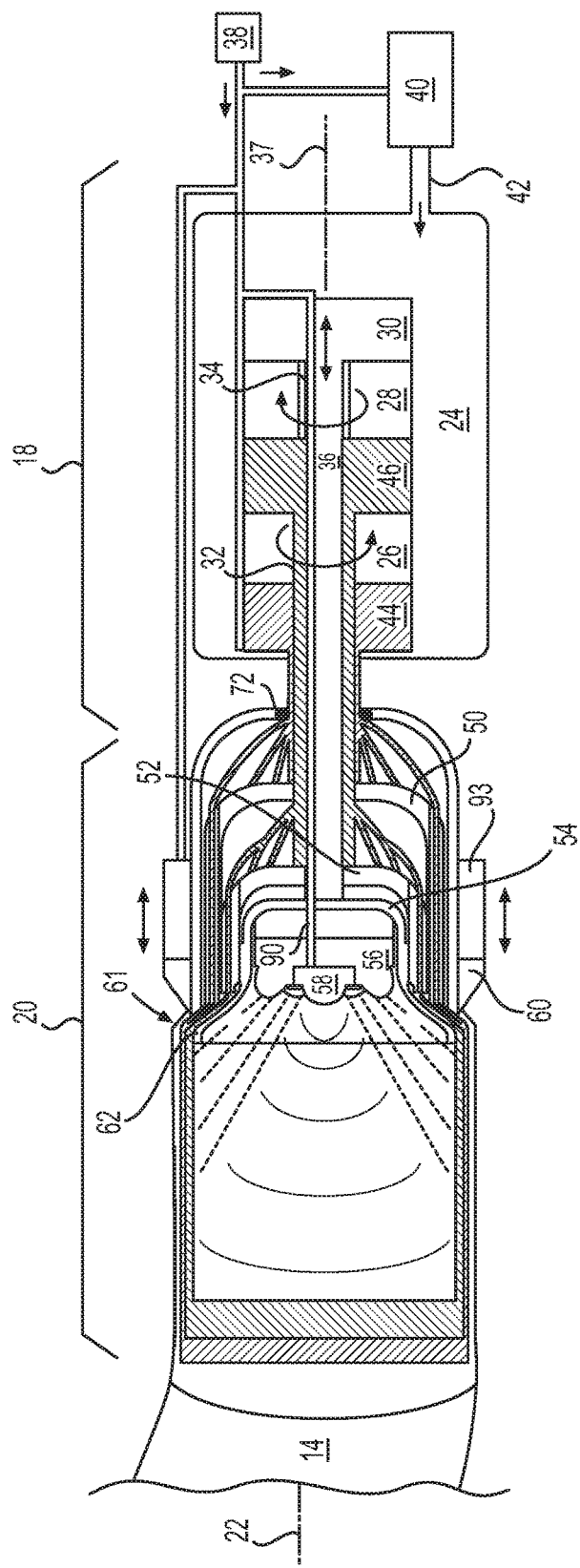
FIG. 3 is cross-sectional illustration of an exemplary disclosed drive and head that may be used in conjunction with the manufacturing systems of FIGS. 1 and 2.

As shown in FIG. 3, drive 18, in addition to functioning as a mechanical coupling between head 20 and support 16, may include components that cooperate to also supply power to head 20. These components may include, among other things, a container 24, one or more actuators disposed inside container 24, and a plurality of links connecting the various actuators to different portions of head 20. In the disclosed embodiment, three different actuators 26, 28, 30 are shown inside of container 24 as being coupled to head 20 by way of two different shafts 32, 34 and a rod 36. Actuators 26 and 28 may be rotary-type actuators (e.g., electric, hydraulic, or pneumatic motors), while actuator 30 may be a linear-type actuator (e.g., a solenoid actuator, a hydraulic cylinder, a lead screw, etc.). Shaft 32 may be tubular (i.e., cylindrical and hollow) and driven by actuator 26 to rotate about an axis 37, and shaft 34 may pass through a center of shaft 32 and be driven by actuator 28 to also rotate about axis 37. For the purposes of this disclosure, axis 37 may be considered a non-fiber axis of head 20. In the disclosed embodiment, shaft 34 is also tubular, and rod 36 may be configured to pass through a center of shaft 34 and be driven by actuator 30 to move axially in-and-out with respect to shaft 34. Rod 36 may also be generally aligned with axis 37. It is contemplated that a different number of actuators could be coupled with head 20 by way of a different arrangement of shafts and/or rods, if desired. For example, a single actuator could be coupled to rotate both of shafts 32, 34 (e.g., by way of a gear train—not shown), if desired. Electricity may be provided to actuators 30-34 from an external supply (e.g., an established utility grid) 38.

In addition to functioning as a mounting location for the various actuators described above, container 24 may also function as a pressure vessel in some embodiments. For example, container 24 may be configured to receive or otherwise contain a pressurized matrix material. The matrix material may include any type of liquid resin (e.g., a zero volatile organic compound resin) that is curable. Exemplary resins include epoxy resins, polyester resins, cationic epoxies, acrylated epoxies, urethanes, esters, thermoplastics, photopolymers, polyepoxides, and more. In one embodiment, the pressure of the matrix material inside container 24 may be generated by an external device (e.g., an extruder or another type of pump) 40 that is fluidly connected to container 24 via a corresponding conduit 42. In another embodiment, however, the pressure may be generated completely inside of container 24 by a similar type of device. In some instances, the matrix material inside container 24 may need to be kept cool and/or dark in order to inhibit premature curing; while in other instances, the matrix material may need to be kept warm for the same reason. In either situation, container 24 may be specially configured (e.g., insulated, chilled, and/or warmed) to provide for these needs.

The matrix material stored inside container 24 may be used to coat any number of separate fibers and, together with the fibers, make up a wall of composite structure 14. In the disclosed embodiment, two separate fiber supplies 44, 46 are stored within (e.g., on separate internal spools—not shown) or otherwise passed through container 24 (e.g., fed from the same or separate external spools). In one example, the fibers of supplies 44, 46 are of the same type and have the same diameter and cross-sectional shape (e.g., circular, square, flat, etc.). In other examples, however, the fibers of supplies 44, 46 are of a different type, have different diameters, and/or have different cross-sectional shapes. Each of supplies 44, 46 may include a single strand of fiber, a tow or roving of several fiber strands, or a weave of fiber strands. The strands may include, for example, carbon fibers, vegetable fibers, wood fibers, mineral fibers, glass fibers, metallic wires, etc.

The fibers from supplies 44, 46 may be coated with the matrix material stored in container 24 while the fibers are inside container 24, while the fibers are being passed to head 20, and/or while the fibers are discharging from head 20, as desired. The matrix material, the dry fibers from one or both of supplies 44, 46, and/or fibers already coated with the matrix material may be transported into head 20 in any manner apparent to one skilled in the art. In the embodiment of FIG. 3, the matrix material is mixed with the fibers from both supplies 44, 46, and the matrix-coated fibers are then directed into head 20 via the open interior(s) of shaft(s) 32 and/or 34. It is contemplated, however, that dedicated conduits (not shown) could alternatively be used for this purpose, if desired. The matrix material may be pushed through shaft(s) 32, 34 (and/or the dedicated conduit(s)) by the pressure of container 24, and the fibers may travel along with the matrix material. Alternatively or additionally, the fibers (coated or uncoated) may be mechanically pulled through shafts 32 and/or 34, and the matrix material may be pulled along with the fibers in some embodiments. In the disclosed example, electricity is also supplied to head 20 by way of the empty interior(s) of shaft(s) 32 and/or 34.

Figure 4:
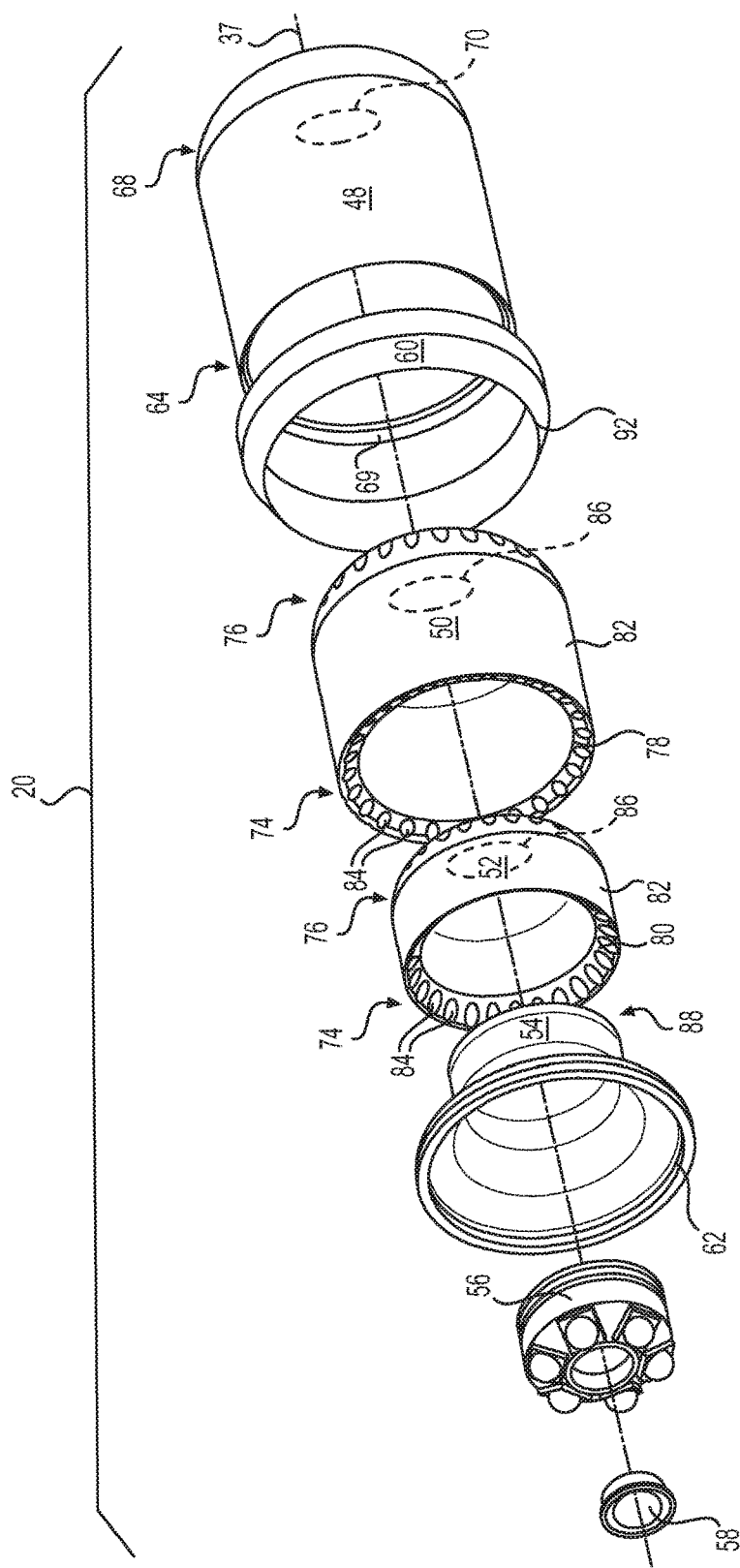
FIG. 4 is an exploded view illustration of the head of FIG. 3.

Head 20 may include a series of cylindrical components nested inside each other that function to create unique weave patterns in the walls of structure 14 out of the matrix-coated fibers received from drive 18. As seen in FIGS. 3 and 4, these components may include, among other things, a housing 48, one or more fiber guides (e.g., a first fiber guide 50 and a second fiber guide 52), a diverter 54, one or more cure enhancers (e.g., a UV light 56 and/or an ultrasonic emitter 58), and a cutoff 60. As will be explained in more detail below, matrix-coated fibers from drive 18 may pass through first and/or second fiber guides 50, 52, where a rotation in the fibers may be generated. The rotating matrix-coated fibers may then pass through an annular gap 61 (shown only in FIG. 3) between diverter 54 and housing 48 and around a mouth 62 of diverter 54, where the resin is caused to cure from the inside-out by way of UV light 56 and/or ultrasonic emitter 58.

Housing 48 may be generally tubular, and have an open end 64 (shown only in FIG. 4) and an opposing domed end 68. An inner diameter of housing 48 at open end 64 may be larger than outer diameters of fiber guides 50, 52, and an internal axial length of housing 48 may be greater than axial lengths of fiber guides 50, 52. With this arrangement, fiber guides 50, 52 may fit at least partially inside housing 48. In the disclosed embodiment, both fiber guides 50, 52 nest completely inside of housing 48, such that an axial face 69 of housing 48 at open end 64 extends past corresponding ends of fiber guides 50, 52. Face 69 of housing 48 at open end 64 may be convexly curved to mirror a correspondingly curved outer surface of diverter 54. A center opening 70 may be formed within domed end 68 of housing 48, allowing shaft 32, shaft 34, and rod 36 to pass axially therethrough. In some embodiments, a seal 72 (e.g., an o-ring—shown only in FIG. 3) may be disposed at opening 70 and around shaft 32 to inhibit liquid matrix material from leaking out of housing 48.

Fiber guides 50 and 52, like housing 48, may also be generally tubular and have an open end 74 and a domed end 76 located opposite open end 74. An inner diameter of fiber guide 50 at open end 74 may be larger than an outer diameter of fiber guide 52 at domed end 76, and an internal axial length of fiber guide 50 may be greater than an external axial length of fiber guide 52. With this arrangement, fiber guide 52 may fit at least partially inside fiber guide 50. In the disclosed embodiment, fiber guide 52 nests completely inside of fiber guide 50, such that an end face 78 of fiber guide 50 at open end 74 extends axially past an end face 80 of fiber guide 52. End faces 78 and 80 of fiber guides 50, 52 may be convexly curved to mirror the correspondingly curved outer surface of diverter 54.

Fiber guides 50 and 52 may each have an annular side wall 82 that extends from open end 74 to domed end 76. In the disclosed example, a thickness of each side wall 82 may be about the same within engineering tolerances). However, it is contemplated that each side wall 82 could have a different thickness, if desired. The thickness of side walls 82 may be sufficient to internally accommodate any number of axially oriented passages 84. Passages 84 may pass from the corresponding end face (i.e., end face 78 or 80) completely through domed end 76. Each passage 84 formed in fiber guide 50 may be configured to receive one or more fibers from one of supplies 44, 46, while each passage 84 formed in fiber guide 52 may be configured to receive one or more fibers from the other of supplies 44, 46. It is contemplated that the same or a different number of passages 84 may be formed within each of fiber guides 50 and 52, as desired, and/or that passages 84 may have the same or different diameters. In the disclosed embodiment, twenty-four equally spaced passages 84 having substantially identical diameters are formed in each of fiber guides 50, 52. Because annular wall 82 of fiber guide 52 may have a smaller diameter than annular wall 82 of fiber guide 50, the equal spacing between passages 84 within fiber guide 52 may be different than the corresponding equal spacing between passages 84 within fiber guide 50. It should be noted that passage spacing within one or both of fiber guides 50, 52 could be unequally distributed in some embodiments. Because fiber guide 52 may nest completely inside fiber guide 50, the fibers passing through fiber guide 50 may generally be overlapped with the fibers passing through fiber guide 52 during fabrication of structure 14.

Each of fiber guides 50, 52 may be selectively rotated or held stationary during fabrication of structure 14, such that the fibers passing through each guide together create unique weave patterns (e.g., spiraling patterns, oscillating patterns, straight and parallel patterns, or combination patterns). The rotation of fiber guide 50 may be driven via shaft 32, while the rotation of fiber guide 52 may be driven via shaft 34. Shaft 32 may connect to domed end 76 and/or to an internal surface of fiber guide 50. Shaft 34 may pass through a clearance opening 86 in domed end 76 of fiber guide 50 to engage domed end 76 and/or an internal surface of fiber guide 52. As will be described in more detail below, the relative rotations of fiber guides 50, 52 may affect the resulting weave patterns of structure 14. In particular, the rotations of fiber guides 50, 52 may be in the same direction, counter to each other, continuous, intermittent, oscillating, have smaller or larger oscillation ranges, be implemented at lower or higher speeds, etc., in order to produce unique and/or dynamically changing weave patterns having desired properties. In addition, the rotations of fiber guides 50, 52 may be choreographed with the movements of support 16, with the movements of diverter 54, with an axial extrusion distance and/or rate, and/or with known geometry of structure 14 (e.g., termination points, coupling points, tees, diametrical changes, splices, turns, high-pressure and/or high-temperature areas, etc.).

In the disclosed embodiment, diverter 54 is generally bell-shaped and has a domed end 88 located opposite mouth 62. Domed end 88 may have a smaller diameter than mouth 62 and be configured to nest at least partially within fiber guide 52. Mouth 62 may flare radially outward from domed end 88, and have an outer diameter larger than an outer diameter of fiber guide 52. In one embodiment, the outer diameter of mouth 62 may be about the same as an outer diameter of housing 48. Diverter 54, due to its outwardly flaring contour, may function to divert the fibers exiting passages 84 of both fiber guides 50, 52 radially outward. In this manner, a resulting internal diameter of structure 14 may be dictated by the outer diameter of diverter 54. In addition, diverter 54 may divert the fibers against face 69 of housing 48, thereby sandwiching the fibers within gap 61 (referring to FIG. 3). Accordingly, the diverting function of diverter 54, in addition to establishing the internal diameter of structure 14, may also dictate the wall thickness of structure 14. It is contemplated that diverter 54 could have a different shape (e.g., conical, pyramidal, etc.), if desired.

In one embodiment, diverter 54 may be movable to selectively adjust the wall thickness of structure 14. Specifically, rod 36 may pass through clearance openings 86 of fiber guides 50, 52 to engage domed end 76 of diverter 54. With this connection, an axial translation of rod 36 caused by actuator 30 (referring to FIG. 3) may result in a varying width of gap 61 and a corresponding wall thickness of structure 14. Accordingly, thicker walls of structure 14 may be fabricated by pushing diverter 54 away from housing 48, and thinner walls may be fabricated by pulling diverter 54 closer to housing 48.

It is contemplated that particular features within the walls of structure 14 may be created by rapidly changing the width of gap 61 (i.e., by rapidly pulling diverter 54 in and rapidly pushing diverter 54 back out). For example, ridges (see FIG. 8), flanges (See FIG. 7), flexible sections, and other features may be created by adjusting the speed and duration of the pulling/pushing motions.

It is contemplated that a fill material (e.g., an insulator, a conductor, an optic, a surface finish, etc.) could be deposited within the hollow interior of structure 14, if desired, while structure 14 is being formed. For example, rod 36 could be hollow (e.g., like shafts 32, 34) and extend through a center of any associated cure enhancer. A supply of material (e.g., a liquid supply, a foam supply, a solid supply, a gas supply, etc.) could then be connected with an end of rod 36 inside housing 34, and the material would be forced to discharge through rod 36 and into structure 14. It is contemplated that the same sure enhancer used to cure structure 14 could also be used to cure the fill material, if desired, or that another dedicated cure enhancer (not shown) could be used for this purpose. In one particular embodiment, the portion of rod 36 that extends past the cure enhancer and into the interior of structure 14 could be flexible so that engagement with structure 14 would not deform or damage structure 14. In the same or another embodiment, rod 36 may extend a distance into structure 14 that corresponds with curing of structure 14.

UV light 56 may be configured to continuously expose an internal surface of structure 14 to electromagnetic radiation during the formation of structure 14. The electromagnetic radiation may increase a rate of chemical reaction occurring within the matrix material discharging through gap 61, thereby helping to decrease a time required for the matrix material to cure. In the disclosed embodiment, UV light 56 may be mounted within mouth 62 of diverter 54 in general alignment with axis 37, and oriented to direct the radiation away from diverter 54. UV light 56 may include multiple LEDs (e.g., 6 different LEDs) that are equally distributed about axis 37. However, it is contemplated that any number of LEDs or other electromagnetic radiation sources could alternatively be utilized for the disclosed purposes. UV light 56 may be powered via an electrical lead 90 that extends from supply 38 (referring to FIG. 3) through shafts 32, 34 and rod 36. In some embodiments, rod 36 may itself function as electrical lead 90. The amount of electromagnetic radiation may be sufficient to cure the matrix material before structure 14 is axially extruded more than a predetermined length away from mouth 62. In one embodiment, structure 14 is completely cured before the axial extrusion length becomes equal to an external diameter of structure 14.

Ultrasonic emitter 58 may be used in place of or in addition to UV light 56 to increase the cure rate of the matrix material in structure 14. For example, ultrasonic emitter 58 could be mounted directly inside mouth 62 of diverter 54 or alternatively mounted to (e.g., within a corresponding recess of) a distal end of UV light 56. Ultrasonic emitter 58 may be used to discharge ultrasonic energy to molecules in the matrix material, causing the molecules to vibrate. The vibrations may generate bubbles in the matrix material, which cavitate at high temperatures and pressures, which force the matrix material to cure quicker than otherwise possible. Ultrasonic emitter 58 may be powered in the same manner as UV light 56, and also function to cure structure 14 from the inside-out. It is contemplated that, in addition to or in place of UV light 56 and/or ultrasonic emitter 58, one or more additional cure enhancers (not shown) could be located to help speed up a cure rate of structure 14 from the outside-in, if desired.

Cutoff 60 may be used to selectively terminate or otherwise fix a length of structure 14 during manufacturing thereof. As shown in FIGS. 3 and 4, cutoff 60 may be generally ring-like, and moveably mounted to an external surface of housing 48. Cutoff 60 may have a sharpened edge 92 that is configured to slide along axis 37 until it engages the matrix-coated fibers discharging through gap 61. Further sliding in the same direction may then function to shear the fibers against mouth 62, thereby fixing a length of structure 14. It should be noted that this shearing action may take place only while the matrix material is still uncured, such that a force required to push edge 92 through the fibers of structure 14 may be lower and a resulting cut surface may have a finer finish.

The axial movement of cutoff 60 may be generated by a dedicated actuator 93 (see FIG. 3). Actuator 93 may be mounted to housing 48 and embody a linear actuator (e.g., a hydraulic piston or a solenoid) or a rotary actuator (e.g., a motor that engages external threads on housing 48), as desired. Actuator 93 may receive electrical power from supply 38 via external wiring.

In some embodiments, the motion of cutoff 60 may be coordinated with the motion of diverter 54 during the fiber shearing of structure 14. For example, just prior to or during the axial movement of cutting edge 92 toward the fibers of structure 14, diverter 54 may be pulled inward toward housing 48 by rod 36 and actuator 30. By pulling diverter 54 inward, a wall thickness of structure 14 may be reduced and thereby made easier to shear. In addition, by pulling diverter 54 inward, a greater clamping force may be exerted on the fibers, thereby reducing the required shearing force and/or movement of cutting edge 92.

Figure 5:
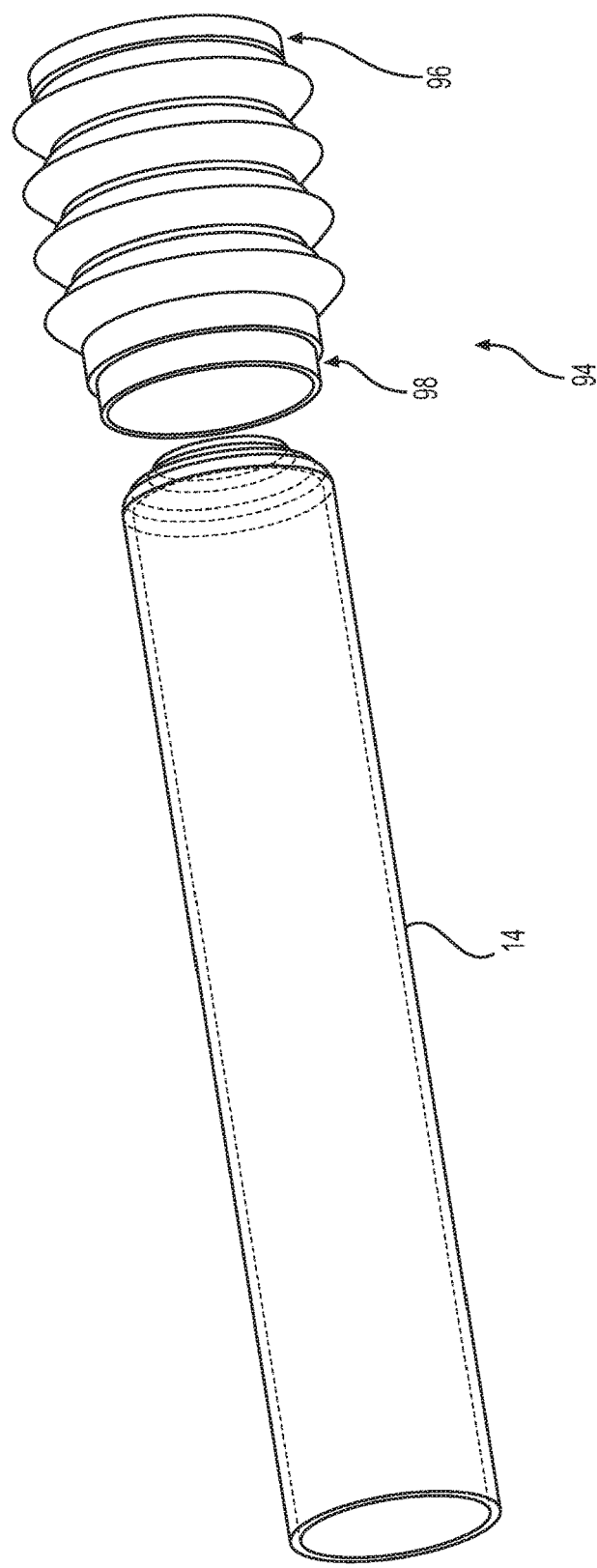
FIG. 5 is a perspective illustration of an exemplary disclosed shield that may be connected to the head of FIGS. 3 and 4.

Even though the matrix-coated fibers of structure 14 may be quickly cured after discharge through gap 61, the speed of this cure may be insufficient for some applications. For example, when manufacturing structure 14 under water, in space, or in another inhospitable environment of unideal (e.g., severe or extreme) temperatures, unideal pressures, and/or high-contamination, the matrix-coated fibers should be shielded from the environment until the cure is complete so as to ensure desired structural characteristics. For this reason, a shield 94 may be provided and selectively coupled to a distal end of head 20. An exemplary shield 94 is shown in FIG. 5 as including a flexible coupling. In this embodiment, shield 94 may have a first end 96 having a diameter large enough to internally receive and seal the distal end of head 20, and a second end 98 having a diameter large enough to internally receive and seal around structure 14. A length of shield 94 may be sufficient to provide a desired curing time for structure 14, such that the portion of structure 14 engaged by second end 98 is sufficiently cured and will not be deformed by the engagement. Shield 94 may provide a more controlled environment for structure 14, allowing the matrix therein to cure by a desired amount prior to structure 14 being exposed to the inhospitable environment. In some embodiments, shield 94 may be pressurized with an inert gas, pressurized with a gas that increases a cure rate of the matrix, and/or depressurized to more fully control the environment surrounding structure 14 during manufacture. Shield 94 may be flexible, allowing for structure 14 to bend and curve relative to axis 37 (referring to FIG. 3) as it is extruded from head 20.

System 10 may be capable of producing many different weave patterns within the walls of structure 14. FIGS. 6-9 illustrate exemplary structures 14 that may be possible to manufacture with system 10. FIGS. 10-18 illustrate examples of weave patterns that may be used to make structure 14. FIGS. 6-18 will be discussed in more detail in the following section to further illustrate the disclosed concepts.

INDUSTRIAL APPLICABILITY

The disclosed systems may be used to continuously manufacture composite structures having any desired cross-sectional shape and length. The composite structures may include any number of different fibers of the same or different types and of the same or different diameters. In addition, the weave patterns used to make the composite structures may be dynamically changed during manufacture of the structures (e.g., without interrupting extrusion of structure 14). Operation of system 10 will now be described in detail.

At a start of a manufacturing event, information regarding a desired hollow structure 14 may be loaded into system 10 (e.g., into a controller responsible for regulating operations of support 16, actuators 26-28, and/or extruder 40). This information may include, among other things, a size (e.g., diameter, wall thickness, length, etc.), a contour (e.g., a trajectory of axis 22) surface features (e.g., ridge size, location, thickness, length; flange size, location, thickness, length; etc.), connection geometry (e.g., locations and sizes of couplings, tees, splices, etc.), desired weave patterns, and weave transition locations. It should be noted that this information may alternatively or additionally be loaded into system 10 at different times and/or continuously during the manufacturing event, if desired. Based on the component information, one or more different fibers and/or resins may be selectively installed into system 10. Installation of the fiber(s) may include threading of the fiber(s) through shafts 32, 34, through passages 84 in guides 50, 52, and through gap 61. In some embodiments, the fiber(s) may also need to be connected to a pulling machine (not shown) and/or to a mounting fixture (not shown). Installation of the matrix material may include filling of container 24 and/or coupling of extruder 40 to container 24. In some embodiments, depending on the gathered component information, diverters having larger or smaller diameters, and any number of different configurations of fiber guides may be selectively used with head 20.

The component information may then be used to control operation of system 10. For example, the fibers may be pulled and/or pushed along with the matrix material from head 20 at a desired rate at the same time that drive 18 causes fiber guides 50, 52 to rotate. During this rotation, diverter 54 may also be caused to move in or out, and any available cure enhancers (e.g., UV light 56 and/or ultrasonic emitter 58) may be activated to cure the matrix material. Support 16 may also selectively move head 20 in a desired manner, such that axis 22 of the resulting hollow structure 14 follows a desired trajectory. Once structure 14 has grown to a desired length, cutoff 60 may be used to sever structure 14 from system 10 in the manner described above.

FIG. 6 illustrates one example of structure 14 that may be produced by system 10. As can be seen in this figure, axis 22 of structure 14 may be translated and/or rotated (e.g., via corresponding movements of head 20) in any direction during the lengthwise growth of structure 14 to produce complex geometry. In addition, the weave pattern of structure 14 may be choreographed with the changing geometry. In the example of FIG. 6, an elbow has been created having multiple weave patterns that transition around a corner section 100. Specifically, the fibers passing through one of guides 50 or 52 oscillate at opposing ends of corner section 100, but straighten out (i.e., align with axis 22) inside of corner section 100. At the same time, the fibers passing through the other of guides 50 or 52 remain straight throughout the length of structure 14. In addition, a frequency of the oscillating fibers may vary. In particular, the oscillating fibers may oscillate at a slower frequency for a section 102, and then at a higher frequency for a section 104. This frequency-changing pattern may be repetitive in some applications.

It is contemplated that the weave pattern used at any particular point along the length of structure 14 may be selected in order to provide desired characteristics at the corresponding point. For example, oscillating patterns may be effectively used where slight movement and/or flexing of structure 14 is desired and/or expected over small and large distances. One application where oscillating patterns could be helpful may include the manufacture of a gas pipeline over arctic tundra for many continuous miles. In this application, the freezing and thawing of the tundra could cause undesired movements of the pipeline that must be accommodated in order to avoid cracking of the pipeline. The movements may be accommodated via the oscillating weave pattern. The oscillating weave pattern may also add toughness and or abrasion resistance to structure 14. The fibers within section 100 may all be parallel in order to produce a different characteristic within structure 14. For example, parallel fibers may provide for high static strength, where little or no bending is desired or expected.

FIG. 7 illustrates another example of structure 14 that may be produced by system 10. As can be seen in this figure, a coupling 106 is used at a terminal end of structure 14 to connect structure 14 to another device (not shown) or to otherwise close off the end of structure 14. The use of coupling 106 may require different characteristics (e.g., greater strength or stiffness) in the walls of structure 14 and, thus, the weave pattern and/or thickness of structure 14 may change at the coupling location in a corresponding way. For instance, the weave pattern may become denser at this location and/or the wall thickness may increase. The weave pattern may become denser by increasing an oscillation frequency for a given axial growth rate (i.e., for a given extrusion rate) and/or by increasing an oscillation range. The wall thickness may increase at this location by causing diverter 54 to be pushed further away from housing 48, such that gap 61 becomes larger.

FIG. 8 illustrates another example of structure 14 that may be produced by system 10. As can be seen in this figure, the geometry of structure 14 changes (e.g., necks down) at a transition location 108 and at a terminal location 110. These geometry changes may involve corresponding changes in the weave pattern and/or in an outer profile of structure 14. For instance, the weave pattern at transition location 108 may change from oscillating and parallel fibers to only parallel fibers (or alternatively to only oscillating fibers). In addition, ridges 112 may be formed at terminal location 110 via the rapid in/out movements of diverter 54. The parallel fibers may enhance a rigidity at transition location 108, while ridges 112 may facilitate connection with another structure.

FIG. 9 illustrates a final example of structure 14 that may be produced by system 10. As can be seen in this figure, the geometry of structure 14 does not necessarily change. However, changes in the weave pattern of structure 14 may still be varied for application-specific purposes. In particular, a specific portion 114 of structure 14 may have different characteristics than other portions 116 of the same structure, even though all portions have the same general geometry. For instance, a greater resistance to external temperatures and/or pressures may be required within portion 114; a greater abrasion resistance may be required; and/or a greater flexibility and/or rigidity may be required. These characteristics may be provided by way of varying weave patterns. In the disclosed example, the weave pattern within portion 114 includes parallel fibers on only one section (e.g., one halt) and a density of oscillating fibers on remaining sections that is different than a fiber density within portions 116.

Figure 10:
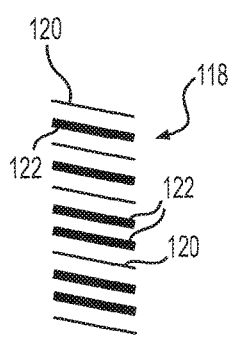
FIGS. 10-18 are diagrammatic illustrations of exemplary disclosed weave patterns at may make up walls of the hollow structures of FIGS. 6-9.

FIGS. 10-18 illustrate exemplary weave patterns that may be used at any location on any structure 14, regardless of structure 14 having changing geometry or characteristic requirements. In FIG. 10, a pattern 118 uses spiraling fibers 120 from guide 50 and spiraling fibers 122 from guide 52. Spiraling patterns of fibers are known to increase a resistance to internal pressures. At a top of pattern 118, fibers 120 may be equally interleaved with fibers 122 and may be identical fibers or fibers of different diameters, shapes, and/or sizes, as desired. About midway down pattern 118, however, the fibers may transition to a different weave, wherein two of fibers 122 are immediately adjacent each other. This new pattern may be achieved, for example, by increasing a rotational rate of guide 52 to be twice the rotational rate of guide 50.

Figure 11:
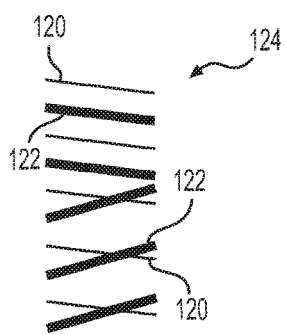
Figure 12:
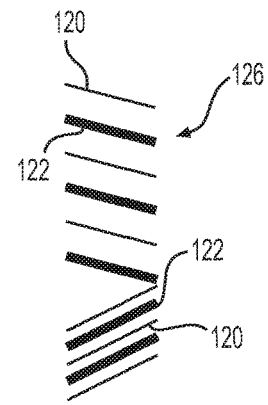
Figure 13:
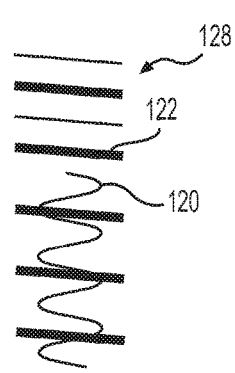

In FIG. 11, a pattern 124 is created that transitions from both of fibers 120, 122 spiraling in a first direction to one of fibers 120, 122 spiraling in a different direction. A similar pattern 126 is shown in FIG. 12, but instead of one of fibers 120, 122 transitioning to a different direction, both of fibers 120, 122 transition to the different direction. Another similar pattern 128 is shown in FIG. 13, but instead of only one of fibers 120, 122 transitioning to spiraling in a different direction, one of fibers 120, 122 transitions to oscillating rather than spiraling.

Figure 14:
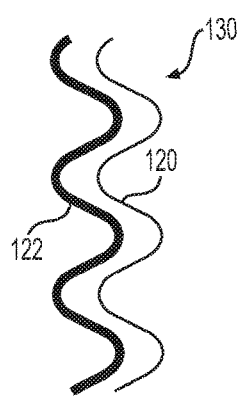
Figure 15:
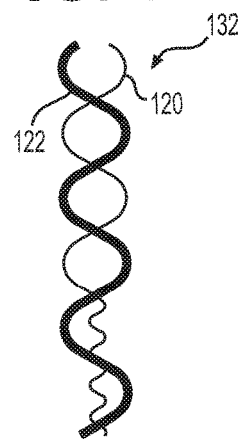
Figure 16:
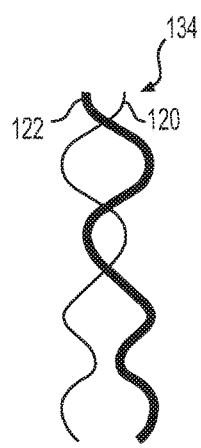

In FIG. 14, a pattern 130 is created that includes both of fibers 120 and 122 oscillating in a relatively synchronized manner. This synchronicity may involve both fibers 120, 122 oscillating at about the same frequency, in phase with each other, and through the same ranges. FIG. 15 shows a pattern 132, wherein fibers 120 and 122 are oscillating out of phase with each other using essentially the same frequency and range. However, one of fibers 120, 122 transitions about half-way along the length of pattern 132 to oscillate at a different frequency and/or through a different range. In FIG. 16, a pattern 134 is shown as having fibers 120 and 122 oscillating out of phase using essentially the same frequency and range. However, one or both of fibers 120, 122 may shift radial locations about half-way along the length of pattern 134 to move from being overlapping to being adjacent to each other.

Figure 17:
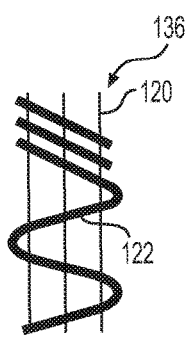
Figure 18:
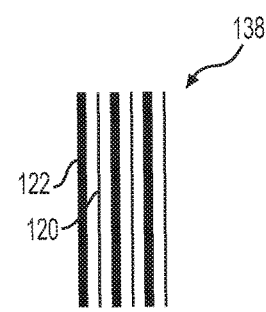

In a pattern 136 of FIG. 17, one of fibers 120, 122 is shown as being straight and generally aligned with axis 22 (referring to FIGS. 1 and 2), while the other of fibers 120, 122 is initially spiraling at an upper-half of pattern 136. The spiraling fiber 120 or 122 then transitions to oscillating at a lower-half of pattern 136. In a pattern 138 of FIG. 18, all of fibers 120, 122 are straight and aligned with axis 22, and equally interleaved with each other.

It will be apparent to those skilled in the art that various modifications and variations can be made to the disclosed method. Other embodiments will be apparent to those skilled in the art from consideration of the specification and practice of the disclosed method. It is intended that the specification and examples be considered as exemplary only, with a true scope being indicated by the following claims and their equivalents.

What is claimed is:

1. A method of continuously manufacturing a composite hollow structure, comprising:
    continuously coating fibers with a matrix to form matrix-coated fibers;
    revolving the matrix-coated fibers about a non-fiber axis;
    diverting the matrix-coated fibers radially outward away from the non-fiber axis;
    dynamically adjusting a trajectory of the non-fiber axis of the composite hollow structure; and
    curing the matrix-coated fibers to maintain the adjusted trajectory of the composite hollow structure.

2. The method of claim 1, wherein revolving matrix-coated fibers includes:
    revolving a first subset of the matrix-coated fibers in a first direction; and
    revolving a second subset of the matrix-coated fibers in a second direction opposite the first direction.

3. The method of claim 2, wherein revolving the first and second subsets of matrix-coated fibers includes synchronously oscillating between the first and second directions.

4. The method of claim 2, wherein revolving the first and second subsets of matrix-coated fibers includes revolving the first and second subsets of matrix-coated fibers through a range of up to 180°.

5. The method of claim 4, wherein revolving the first and second subsets of matrix-coated fibers includes revolving the first and second subsets of matrix-coated fibers through a range of about 15° to about 30°.

6. The method of claim 2, wherein revolving the first and second subsets of the matrix-coated fibers includes revolving the first subset of the matrix-coated fibers through a range different than a revolving range of the second subset of the matrix-coated fibers.

7. The method of claim 2, wherein revolving the first and second subsets of the matrix-coated fibers includes continuously revolving the first subset of the matrix-coated fibers in the first direction and selectively revolving the second subset of the matrix coated fibers in the first direction.

8. The method of claim 2, wherein revolving the first and second subsets of the matrix-coated fibers includes revolving the first subset of the matrix-coated fibers at a first rate and revolving the second subset of the matrix-coated fibers at a second rate.

9. The method of claim 8, further including dynamically adjusting the first and second rates during manufacturing of the composite hollow structure.

10. The method of claim 2, further including dynamically adjusting a pattern of weave created by revolving the first and second subsets of matrix-coated fibers during manufacturing of the composite hollow structure.

11. The method of claim 2, further including pressing the first subset of the matrix-coated fibers against the second subset of the matrix-coated fibers.

12. The method of claim 11, further including varying the pressing to thereby adjust a wall thickness of the composite hollow structure.

13. The method of claim 2, wherein the first subset of the matrix-coated fibers has at least one of a different diameter and a different material type than the second subset of the matrix-coated fibers.

14. The method of claim 2, wherein the first subset of the matrix-coated fibers has a different type of matrix than the second subset of the matrix-coated fibers.

15. The method of claim 1, wherein curing the matrix-coated fibers includes curing the matrix-coated fibers from inside the composite hollow structure.

16. The method of claim 1, wherein curing the matrix-coated fibers includes directing at least one of UV light and ultrasonic vibrations toward the matrix-coated fibers.

17. The method of claim 16, further including controlling an environment of the matrix-coated fibers for a period of time during and after the at least one of the UV light and the ultrasonic vibrations are directed toward the matrix-coated fibers.

18. The method of claim 1, further including mechanically pinching the matrix-coated fibers prior to curing the matrix-coated fibers in order to fix a length of the composite hollow structure.

19. The method of claim 1, further including filling an interior of the composite hollow structure as the hollow structure is curing.

20. A method of continuously manufacturing a composite hollow structure, comprising:
    continuously coating fibers with a matrix to form matrix-coated fibers;
    revolving a first subset of the matrix-coated fibers in a first direction; and
    revolving a second subset of the matrix-coated fibers in a second direction opposite the first;
    diverting the first and second subsets of the matrix-coated fibers radially outward away from a non-fiber axis;
    pressing the first subset of the matrix-coated fibers against the second subset of the matrix-coated fibers;
    dynamically adjusting revolving of the first and second subsets of the matrix-coated fibers during manufacturing of the composite hollow structure;
    curing the first and second subsets of the matrix-coated fibers to retain the adjusted first and second subsets of the matrix coated fibers; and
    mechanically pinching the first and second subsets of the matrix-coated fibers prior to curing the first and second subsets of the matrix-coated fibers in order to fix a length of the composite hollow structure.

* * * * *